United States Patent Office 3,154,528
Patented Oct. 27, 1964

3,154,528
VANADIUM POLYMERIZATION CATALYST AND PROCESS OF POLYMERIZING THEREWITH
Alfred P. Kottenhahn, Wilmington, Del., assignor to E. I. du Pont de Nemours and Company, Wilmington, Del., a corporation of Delaware
No Drawing. Filed July 5, 1962, Ser. No. 207,791
10 Claims. (Cl. 260—80.7)

This invention relates to a novel catalyst system and more particularly to a catalyst obtained by mixing vanadium tetrachloride with selected organometallic compounds having a hetero atom which is separated by 3 or 4 carbon atoms from the metal.

High molecular weight hydrocarbon polymers and copolymers made by the polymerization or copolymerization of alpha-olefins in the presence of coordination catalysts are acquiring increasing technical and commercial importance today. In this development, coordination catalysts made from vanadium compounds and organo aluminum compounds have exhibited unusual promise. Unfortunately, at temperatures well above room temperature, for example 70° C. or above, the activity of these known vanadium catalysts tends to deteriorate too quickly for them to be entirely satisfactory. For commercial operation it would be particularly desirable to carry out polymerizations at temperatures of at least 50–150° C. The decreased viscosity of the reaction medium at these higher temperatures facilitates the agitation and enhances the desired heat transfer. In addition, the recovery and recycle of the unreacted monomer is more efficiently and economically carried out; the hotter the effluent from the reactor, the better the unreacted monomer can be flashed off and recovered. In contrast, if the reaction is carried out at a temperature only slightly above room temperature, additional heat must be supplied; the more viscous nature of the cooler effluent makes proper heat transfer difficult.

It is an object of the present invention to provide a new coordination polymerization catalyst system which is useful at temperatures at least as high as 150° C. A further object is to provide a process for preparing this catalyst system. A still further object is to provide a process for preparing polymeric materials by polymerization or copolymerization of hydrocarbon monomers in the presence of this new catalyst. Other objects will appear hereinafter.

These and other objects of this invention are accomplished by providing a catalyst obtained by mixing vanadium tetrachloride with an organometallic compound having a structure selected from the group consisting of

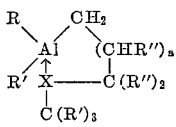

and

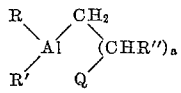

wherein R is an alkyl radical of from 1 to 8 carbon atoms; R' is a radical selected from the group consisting of hydrogen and an alkyl radical of from 1 to 8 carbon atoms; R" is a radical selected from the group consisting of hydrogen and an alkyl radical of from 1 to 2 carbon atoms; $a$ is an integer from 1 to 2; X is a radical selected from the group consisting of —O—, —S—, and

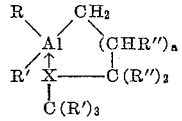

and Q is a 5 to 6 membered heterocyclic radical selected from the group consisting of

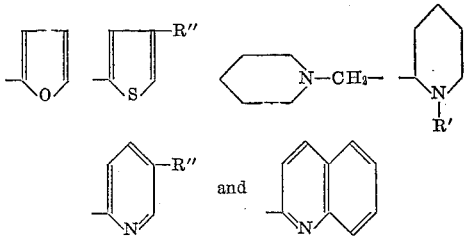

A convenient method for preparing the novel catalyst is to mix the vanadium compound with the aluminum compound in an inert hydrocarbon or hallogenated hydrocarbon solvent.

The heart of the present invention is the surprising and unexpected discovery that a catalyst composition displaying superior activity for polymerizing or copolymerizing hydrocarbon monomers at relatively high temperatures can be formed by mixing a very specific vanadium compound with a selected organometallic compound which can undergo internal chelation by an oxygen, sulfur or nitrogen atom separated by 3 or 4 carbon atoms from the metal. It is believed that this chelation involves coordination of the free coordination site of the metal in the organometallic compound with these oxygen, sulfur or nitrogen atoms. It has been found that the activity of this novel catalyst depends to a remarkable degree upon the nature of its components. As is illustrated in the examples which follow, it has been found that replacement of vanadium tetrachloride by such conventional and closely related vanadium compounds such as vanadium oxytrichloride, gives a catalyst which is relatively inactive as compared with the novel catalyst system of the present invention. If the internally chelated organometallic compound used in the present invention is replaced by a conventional organometallic compound such as diisobutylaluminum chloride or triisobutyl aluminum, the resulting coordination catalyst displays distinctly inferior activity, particularly at temperatures of about 70° C. or above. Even when an oxygen-substituted compound such as tetrahydrofuran is employed in combination with vanadium tetrachloride and triisobutyl aluminum, the resulting catalyst is still inferior to a marked degree to the catalyst of the present invention at 70° C. or above.

The organometallic compounds which are used in the catalyst system of the present invention are defined above. When no heterocyclic ring is present in these compounds the organometallic material may be represented by the structure wherein R, R', R" and $a$ are as defined above. Preferably, R is isobutyl, R' attached to the aluminum is isobutyl, $a$ is 1, every other R' is methyl or hydrogen and X is —O—. It is to be understood that the radicals represented by R' and R" on any single catalyst molecule may be different. Representative examples of organometallic compounds wherein no heterocyclic ring is present include:

(3-methoxypropyl)methyl aluminum hydride;
(3-ethoxypropyl)isobutyl aluminum hydride;
(3-n-butoxypropyl)ethyl aluminum hydride;
(3-isoamoxypropyl)hexyl aluminum hydride;
(3-methoxybutyl)methyl aluminum hydride;
(3-methoxyisobutyl)propyl aluminum hydride;
(3-propoxyisobutyl)pentyl aluminum hydride;

(3-isopropoxybutyl)isopropyl aluminum hydride;
(3-n-butoxybutyl)heptyl aluminum hydride;
(4-methoxybutyl)ethyl aluminum hydride;
(4-ethoxybutyl)isobutyl aluminum hydride;
(4-isoamoxybutyl)octyl aluminum hydride;
(3-octoxyisobutyl)propyl aluminum hydride;
(3-ethoxypentyl)ethyl aluminum hydride;
(3-methylmercaptopropyl)methyl aluminum hydride;
(3-methylmercaptopropyl)isobutyl aluminum hydride;
(3-ethylmercaptopropyl)ethyl aluminum hydride;
(3-ethylmercaptopropyl)hexyl aluminum hydride;
(3-propylmercaptopropyl)isobutyl aluminum hydride;
(3-propylmercaptopropyl)octyl aluminum hydride;
(3-octylmercaptopropyl)propyl aluminum hydride;
(3-methylmercaptoisobutyl)isopropyl aluminum hydride;
(3-n-butylmercaptoisobutyl)amyl aluminum hydride;
(4-ethylmercaptobutyl)ethyl aluminum hydride;
(4-ethylmercaptobutyl)isobutyl aluminum hydride;
(3-dimethylaminopropyl)methyl aluminum hydride;
(3-dimethylaminopropyl)isobutyl aluminum hydride;
(3-diethylaminopropyl)hexyl aluminum hydride;
(3-diisopropylaminopropyl)isobutyl aluminum hydride;
[3-(N-propyl-N-isopropylamino)propyl]octyl aluminum hydride;
(3-dibutylaminopropyl)isopropyl aluminum hydride;
(3-dimethylaminobutyl)amyl aluminum hydride;
(3-dibutylaminopropyl)heptyl aluminum hydride;
(4-dimethylaminobutyl) isobutyl aluminum hydride;
(4-diethylaminobutyl)ethyl aluminum hydride;
(4-diethylaminoamyl)isobutyl aluminum hydride;
(3-dioctylaminobutyl)propyl aluminum hydride;
(3-methoxypropyl)diethyl aluminum;
(3-ethoxypropyl)diisobutyl aluminum;
(3-isopropoxypropyl)dimethyl aluminum;
(3-isobutoxypropyl)hexyl isobutyl aluminum;
(3-isoamoxypropyl)dipropyl aluminum;
(3-n-octoxypropyl)diisobutyl aluminum;
(3-methoxyisobutyl)diethyl aluminum;
(3-propoxypropyl)di-n-amyl aluminum;
(3-n-butoxyisobutyl)diisobutyl aluminum;
(3-tert-butoxyisobutyl)diethyl aluminum;
(3-n-hexoxyisobutyl)diethyl aluminum;
(3-n-octoxyisobutyl)diisopropyl aluminum;
(3-ethoxy-n-butyl)diisobutyl aluminum;
(3-ethoxy-n-amyl)diethyl aluminum;
(3-ethoxypropyl)diethyl aluminum;
(3-ethoxypropyl)di-n-octyl aluminum;
(4-methoxybutyl)diisobutyl aluminum;
(4-ethoxybutyl)diethyl aluminum;
(4-ethoxybutyl)di-n-heptyl aluminum;
(4-n-heptoxybutyl)diisobutyl aluminum;
(4-isooctoxybutyl)diethyl aluminum;
(3-diethylaminopropyl)diethyl aluminum;
(3-dimethylaminopropyl)dimethyl aluminum;
(3-diethylaminopropyl)diisobutyl aluminum;
(3-di-n-propylaminopropyl)diethyl aluminum;
(3-diisopropylaminopropyl)dihexyl aluminum;
(3-N-propyl-N-isopropyl aminopropyl)diisobutyl aluminum;
(3-dimethylaminopropyl)isoamyl octyl aluminum;
(3-di-n-butylaminopropyl)diisopropyl aluminum;
(3-N-ethyl-N-n-hexylaminopropyl)diethyl aluminum;
(3-dimethylaminobutyl)di-n-propyl aluminum;
(4-N-n-butyl-N-isopropylaminobutyl)diethyl aluminum;
(4-dimethylaminobutyl)di-n-octyl aluminum;
(4-diethylaminobutyl)diisobutyl aluminum;
(4-diethylaminoamyl)diisobutyl aluminum;
(4-N-methyl-N-isopropylaminobutyl)diethyl aluminum;
(4-N-ethyl-N-n-propylaminobutyl)diisoamyl aluminum;
(4-diisooctylaminobutyl)diisopropyl aluminum;
(3-methylmercaptopropyl)diisobutyl aluminum;
(3-ethylmercaptopropyl)diethyl aluminum;
(3-propylmercaptopropyl)diethyl aluminum;
(3-propylmercaptopropyl)diisopropyl aluminum;
(3-n-butylmercaptopropyl)dipropyl aluminum;
(3-n-amylmercaptopropyl)dimethyl aluminum;
(3-tert-amylmercaptopropyl)di-n-hexyl aluminum;
(3-n-hexylmercaptopropyl)diisobutyl aluminum;
(3-methylmercaptoisobutyl)diethyl aluminum;
(3-n-butylmercaptoisobutyl)dipropyl aluminum;
(4-methylmercaptobutyl)diisobutyl aluminum;
(4-ethylmercaptobutyl)ethyl propyl aluminum;
(4-n-octylmercaptobutyl)isoamyl octyl aluminum;
(4-n-heptylmercaptobutyl)diethyl aluminum; and
(4-n-butylmercaptobutyl)di-n-hexyl aluminum.

When a 5–6 membered heterocyclic ring is present the organometallic compounds may be represented by the structure

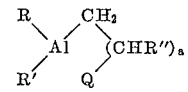

wherein R, R', R'', $a$ and Q are as defined above. Representative examples of organometallic compounds having a heterocyclic ring are:

[2-(2-furyl)ethyl]methyl aluminum hydride;
[2-(2-furyl)ethyl]ethyl aluminum hydride;
[2-(2-furyl)ethyl]isobutyl aluminum hydride;
[2-(2-furyl)propyl]hexyl aluminum hydride;
[2-(2-furyl)propyl]octyl aluminum hydride;
[2-(2-furyl)propyl]isoamyl aluminum hydride;
[2-(2-thienyl)ethyl]methyl aluminum hydride;
[2-(2-thienyl)ethyl]ethyl aluminum hydride;
[2-(2-thienyl)propyl]isobutyl aluminum hydride;
[2-(2-thienyl)propyl]isopropyl aluminum hydride;
[2-(4-methyl-2-thienyl)ethyl]ethyl aluminum hydride;
[3-(2-thienyl)propyl]isobutyl aluminum hydride;
[3-(2-thienyl)propyl]octyl aluminum hydride;
[2-(2-thienyl)propyl]hexyl aluminum hydride;
[3-(1-piperidyl)propyl]ethyl aluminum hydride;
[3-(1-piperidyl)propyl]isobutyl aluminum hydride;
[3-(1-piperidyl propyl]isooctyl aluminum hydride;
[4-(1-piperidyl)butyl]methyl aluminum hydride;
[4-(1-piperidyl)butyl]propyl aluminum hydride;
[4-(1-piperidyl)butyl]hexyl aluminum hydride;
[2-(1-methyl-2-piperidyl)ethyl]butyl aluminum hydride;
[2-(1-methyl-2-piperidyl)ethyl]heptyl aluminum hydride;
[2-(2-pyridyl)ethyl]methyl aluminum hydride;
[2-(2-pyridyl)ethyl]ethyl aluminum hydride;
[2-(2-pyridyl)ethyl]isobutyl aluminum hydride;
[2-(5-ethyl-2-pyridyl)ethyl]propyl aluminum hydride;
[2-(5-ethyl-2-pyridyl)ethyl]heptyl aluminum hydride;
[3-(2-pyridyl)propyl]isobutyl aluminum hydride;
[3-(2-pyridyl)propyl]octyl aluminum hydride;
[2-(2-quinolyl)ethyl]ethyl aluminum hydride;
[2-(2-quinolyl)ethyl]isopropyl aluminum hydride;
[2-(2-furyl)ethyl]dimethyl aluminum;
[2-(2-furyl)ethyl]diethyl aluminum;
[2-(2-furyl)propyl]diisobutyl aluminum;
[2-(2-furyl)propyl]di-n-hexyl aluminum;
[2-(2-furyl)ethyl]di-n-octyl aluminum;
[2-(2-furyl)propyl]ethyl isobutyl aluminum;
[2-(2-thienyl)ethyl]dimethyl aluminum;
[2-(2-thienyl)ethyl]diethyl aluminum;
[2-(2-thienyl)ethyl]diisobutyl aluminum;
[2-(2-thienyl)ethyl]di-n-heptyl aluminum;
[2-(2-thienyl)propyl]diisopropyl aluminum;
[2-(2-thienyl)propyl]dipropyl aluminum;
[2-(2-thienyl)propyl]diisoamyl aluminum;
[3-(2-thienyl)propyl]dimethyl aluminum;
[3-(2-thienyl)propyl]diethyl aluminum;
[3-(2-thienyl)propyl]diisobutyl aluminum;
[3-(2-thienyl)propyl]ethyl isobutyl aluminum;
[3-(2-thienyl)propyl]-n-hexyl methyl aluminum;
[3-(2-thienyl)propyl]diisooctyl aluminum;
[2-(4-methyl-2-thienyl)ethyl]diethyl aluminum;
[2-(4-methyl-2-thienyl)ethyl]diisopropyl aluminum;
[2-(4-methyl-2-thienyl)ethyl]diisobutyl aluminum;

[3-(1-piperidyl)propyl]diethyl aluminum;
[3-(1-piperidyl)propyl]diisobutyl aluminum;
[3-(1-piperidyl)propyl]di-n-hexyl aluminum;
[2-(2-pyridyl)ethyl]dimethyl aluminum;
[2-(2-pyridyl)ethyl]diethyl aluminum;
[2-(2-pyridyl)ethyl]diisobutyl aluminum;
[2-(2-pyridyl)ethyl]diisoamyl aluminum;
[2-(2-pyridyl)ethyl]di-n-octyl aluminum;
[2-(5-ethyl-2-pyridyl)ethyl]diethyl aluminum;
[2-(5-ethyl-2-pyridyl)ethyl]di-n-propyl aluminum;
[2-(5-ethyl-2-pyridyl)ethyl]diisobutyl aluminum;
[3-(2-pyridyl)propyl]dimethyl aluminum;
[3-(2-pyridyl)propyl]diethyl aluminum;
[3-(2-pyridyl)propyl]diisopropyl aluminum;
[3-(2-pyridyl)propyl]diisobutyl aluminum;
[3-(2-pyridyl)propyl]ethyl isoamyl aluminum;
[3-(2-pyridyl)propyl]dioctyl aluminum;
[2-(2-quinolyl)ethyl]dimethyl aluminum;
[2-(2-quinolyl)ethyl]diethyl aluminum;
[2-(2-quinolyl)ethyl]diisobutyl aluminum;
[2-(2-quinolyl)ethyl]methyl isoamyl aluminum;
[2-(2-quinolyl)ethyl]di-n-heptyl aluminum; and
[2-(2-quinolyl)ethyl]ethyl isooctyl aluminum.

The general reaction of aluminum hydrides or alkyl aluminum hydrides with olefins to give aluminum trialkyls and dialkyl aluminum hydrides e.g.

$$AlH_3 + CH_2=CH_2 \rightarrow Al(CH_2CH_3)_3$$
$$AlH_3 + CH_2=C(CH_3)_2 \rightarrow Al[CH_2C(CH_3)_2]_3$$
$$(CH_3CH_2)AlH + CH_2=CHCH_3 \rightarrow (CH_3CH_2)_2Al(CH_2CH_2CH_3)$$

described by K. Ziegler [Belgian Patent 512,267; British Patent 763,824; U.S. Patent 2,826,598; Organometallic Chemistry, ed. by H. Zeiss, Reinhold Publishing Corp., New York, 1960, Chapter 5, pp. 194–221] is applicable here ot the following reactions for preparing the organo aluminum compounds used in the present invention:

(a)
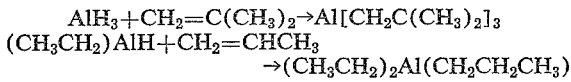

(b)
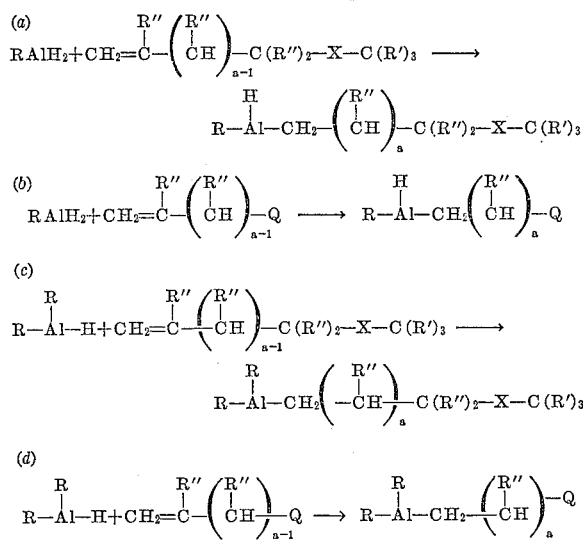

Representative preparations have been disclosed by Zakharkin and Savina [Isvest. Akad. Nauk. SSSR Otdel Khim. Nauk. 1959; 444–449 (English translation, page 420)]. The preparations of (3-diethylaminopropyl)diisobutyl aluminum, (3-ethoxypropyl)diisobutyl aluminum, and (3-n-propylmercaptopropyl)diisobutyl aluminum given in Examples 1, 2 and 9, respectively, hereinafter are further illustrations of representative procedures.

In general the reaction is carried out by mixing the olefin with the dialkyl aluminum hydride (or alkyl aluminum dihydride) while maintaining continual agitation and a protective inert atmosphere (e.g. nitrogen, argon, helium). Since the reaction is often exothermic, it is desirable to provide adequate external cooling facilities and to control the addition of reactants carefully. Thus, it is frequently the practice to add one of the reactants, e.g. the olefin, slowly to the other. The reactants are preferably at or near room temperature, e.g. 20 to 30° C., prior to mixing. During the mixing it is preferred to keep the temperature from exceeding about 120° C., preferably 100° C. since the organo aluminum compounds may decompose to give alkyl aluminum hydrides or even aluminum and hydrogen. Particular care should be taken when the alkyl group is derived from a branched olefin of the type $CH_2=CH-CHR_2$ or $CH_2=CR_2$.

After the heat evolution accompanying the initial mixing has subsided, the mixture is agitated under the protective atmosphere at temperatures in the range of about 60 to 100° C. The reaction time needed will depend upon the particular compounds being reacted, the rates roughly being in the following order:

faster than

In general, the time required will range from about 1 to 24 hours, often from about 3 to 6 hours. The substituted aluminum trialkyl product can be recovered by fractional distillation of the reaction mixture at temperatures below about 120° C. at whatever pressure is required.

When using the alkyl aluminum dihydride to make the alkyl (substituted alkyl) aluminum hydrides, no more than a molar proportion of the olefin should be provided; excess olefin will tend to consume the hydride e.g.

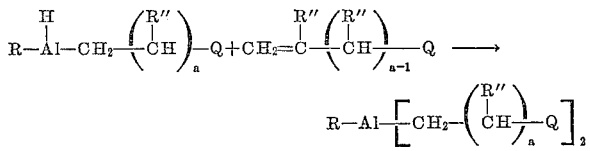

On the other hand, when using the dialkyl aluminum hydride $R_2AlH$ to make the dialkyl mono(substituted alkyl) aluminums, more than a molar proportion of olefin can be supplied. Frequently when the olefin is a volatile liquid, the excess is added to act as the solvent. In representative cases, 3.5 to 4 moles of olefin are supplied for every mole of $R_2AlH$. If the olefin is difficultly volatile, it may be added to a large molar excess of the hydride $RalH_2$ (or $R_2AlH$), if the latter is conveniently volatile, the unreacted hydride being distilled off at the conclusion of the reaction to recover the product organoaluminum compound. If both the aluminum hydride and the olefin are not conveniently volatile, equimolar proportions of each are employed.

The use of a solvent is usually optional, but is generally preferred. It is frequently entirely satisfactory to use excess olefin for this purpose. Liquid media suitable for inert solvents should not adversely affect the desired course of the olefin addition nor the stability of the product. In general they are free from groups bearing Zerewitinoff active hydrogen atoms such as hydroxyl, carboxyl, primary and secondary amino, and mercapto, or of reactive halogens, as well as impurities such as carbon monoxide, carbon dioxide, sulfur dioxide, water, and oxygen. Volatile aliphatic ethers such as ethyl ether, n-propyl ether, isopropyl ether, ethyl-n-butyl ether, tetrahydrofuran, and 1,4-dioxane are sometimes preferred. Volatile saturated aliphatic and cycloaliphatic hydrocarbons such as pentane, cyclopentane, n-hexane, cyclohexane, n-heptane, 2,2,4-trimethylpentane, and methyl cyclohexane are suitable.

The organo aluminum compound can be made at atmospheric or superatmospheric pressure. The choice will depend on operating convenience.

Alternatively, the aluminum compounds used in the present invention can be made by reacting dialkyl aluminum halides or alkyl aluminum halohydrides with primary halogen-substituted ethers, thioethers, or tertiary amines:

(a)
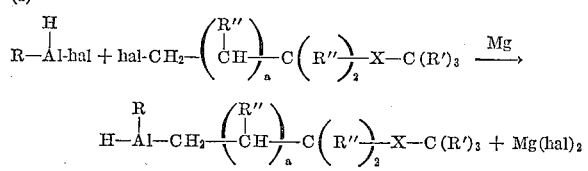

(b)
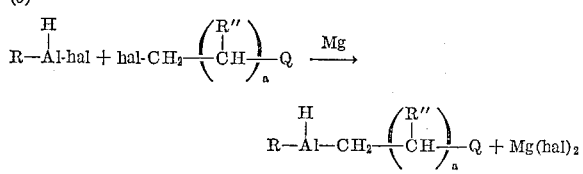

(c)
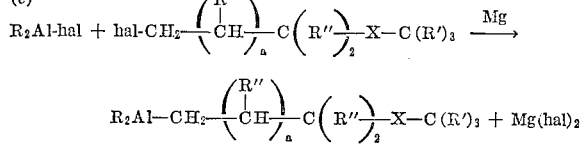

(d)
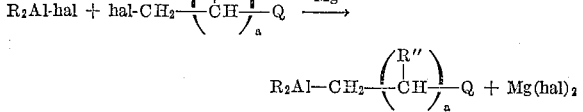

Representative syntheses have been described by Bähr Müller [Chem. Ber. 88, 251, 1765 (1955)].

As indicated above, the novel catalyst of the present invention can be conveniently obtained by mixing and reacting vanadium tetrachloride with the above-defined aluminum compounds. At least one molar proportion of the above described internally chelated organometallic compound should be used with a molar proportion of vanadium tetrachloride. This reaction is carried out in an inert organic solvent which is selected from the group consisting of hydrocarbon and halogenated hydrocarbon compounds. In making the novel catalyst of this invention, the order of addition is not critical. Thus one can first add the vanadium tetrachloride or the organometallic compound or one can add both of them simultaneously. The catalyst can be made in the presence or absence of monomers.

Sufficient organometallic compound is supplied so that the value of the molar ratio of metal to vanadium is at least 1:1. The preferred value for the ratio ranges between 1:1 and 4:1. Values above 4:1, for example as high as about 8:1, can be employed when desired, but are usually not necessary. Those skilled in the art can determine by rountine empirical experiments the optimum value to employ for a particular purpose.

As indicated above, the novel catalyst may be prepared in an inert organic solvent. The concentration of catalyst in this medium is not critical except that it is desirable that the catalyst be well dispersed, preferably in the form of a stable solution. The concentration of vanadium provided by this catalyst in a polymerization mixture should range from aboue 0.00005 to 0.05 molar with 0.00025 to 0.005 molar being preferred and 0.0005 to 0.0010 molar being particularly preferred. However, stronger or more dilute catalyst solutions can be made which are diluted or concentrated, respectively to attain these values.

The catalyst can be made and used in any liquid medium or mixtures suitable for polymerizations with coordination catalysts. In general, the inert organic solvent used for preparing the catalyst is either a hydrocarbon or halogenated hydrocarbon compound. These compounds preferably have about 2 to 22 carbon atoms, still more preferably about 2 to 12 carbon atoms. Tetrachloroethylene is the preferred liquid medium. Other halogenated hydrocarbons, such as methylene chloride, ethyl chloride, and 1,2-dichloroethane can be employed. Another preferred liquid medium is cyclohexane. Other saturated hydrocarbons such as cyclopentane, n-pentane, n-hexane, and n-heptane are also useful. Aromatic hydrocarbons such as benzene, toluene, and xylene can also be employed but are less preferred. Normally liquid or liquefied monomers can be employed in place of part or all of the solvents.

The catalyst can be made in one solvent, for example cyclohexane, and the resulting solution dispersed in another, for example, tetrachloroethylene, the original solvent being removed if desired. Alternatively, the vanadium tetrachloride can be made up in one solvent or mixture of solvents, the organometallic compound can be prepared in a different solvent or different mixture of solvents, and these catalysts component solutions added to still another solvent or mixture of solvents in the reaction vessel.

In general, the catalyst of the present invention can be used in polymerizations or copolymerizations of alphaolefins carried out at atmospheric, subatmospheric, or superatomspheric pressure. Useful temperatures range from about −30° C. to at least 150° C. It is generally inconvenient to operate at temperatures below about −30° C. because additional cooling equipment is required; furthermore, at temperatures much below −30° C. the reaction rate is undesirably reduced and it is more difficult to prepare copolymers of suitable composition. The activity of the catalyst of the present invention tends to decrease as the temperature is raised; however, this catalyst, surprisingly, displays outstanding activity at temperatures as high as 100° C. and permits attainment of satisfactory yields at even higher temperatures. Temperatures at least as high as 150° C. can be employed.

The reasons for the exceptional high temperature stability of the catalyst of the present invention are not entirely understood. The stability is not solely a function of the coordination between the metal of the organo-metallic compound and an oxygen atom, a sulfur atom, or a nitrogen atom because the stability of a vanadium tetrachloride/triisobutyl aluminum/tetrahydrofuran catalyst is markedly inferior to that of $VCl_4/(3$-ethoxypropyl)diisobutyl aluminum of the present invention. It is possible that the stability of the present compound may at least in part be due to the formation of a somewhat stable cyclic chelate formed by coordination of the oxygen, sulfur, or nitrogen atom with the metal holding the carbon chain bearing these hetero atoms. The catalyst of this invention can be stored in the absence of oxygen, carbon monoxide, carbon dioxide, or compounds containing Zerewitinoff-active hydrogen atoms, such as water, alcohol, and carboxylic acids.

The new catalyst system can be employed for making homopolymers of alpha monoolefins of the formula $Y-CH=CH_2$ wherein Y is hydrogen or an alkyl radical of no more than 16 carbon atoms. Representative examples of these monoolefins include: ethylene; propylene; 1-butene; 1-pentene; 1-decene; 1-octadecene; and 4-methyl-1-pentene.

In addition, the new catalyst system can be used in making copolymers of two or more of the above-described alpha monoolefins. Ethylene copolymers are particularly suitable. Representative examples include: ethylene/propylene; ethylene/1-butene; ethylene/1-decene/4-methyl-1-pentene and propylene/1-butene. If an ethylene copolymer with elastomeric properties is desired, the copolymer should contain about 20 to 75 percent by weight of ethylene monomer units.

The catalyst system can also be employed in copolymerizing at least one alpha monoolefin, preferably ethylene, and at least one non-conjugated hydrocarbon diene. Representative dienes include (a) dicyclopentadiene; (b) an open-chain aliphatic $C_6$–$C_{22}$ diene having the formula

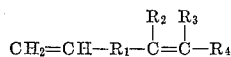

wherein $R_1$ is an alkylene radical, $R_2$ and $R_3$ are independently selected from a group consisting of hydrogen and alkyl radicals and $R_4$ is an alkyl radical; (c) a 5-alkenyl-substituted-2-norbornene having the formula

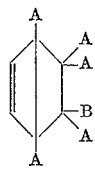

where each A is H or $C_1$–$C_6$ alkyl and B is a monovalent alkenyl radical having an internal (non-terminal) carbon-to-carbon double bond; (d) a 5-alkylidene-2-norbornene having the following structure

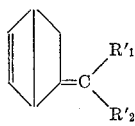

where $R'_1$ and $R'_2$ are H or alkyl radicals having a total between them of up to 16 carbon atoms and (e) a 2-alkyl-2,5-norbornadiene having the following structure

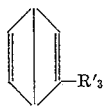

where $R'_3$ is a $C_1$–$C_8$ alkyl radical.

Representative copolymers containing diene monomer units include: ethylene/1,4-hexadiene; ethylene/propylene/1,4-hexadiene; ethylene/propylene/dicyclopentadiene; ethylene/propylene/5-methylene-2-norbornene; ethylene/propylene/5-(2'-ethyl-2'-butenyl)-2-norbornene; and ethylene/1-butene/2-ethyl-2,5-norbornadiene.

In general, it is preferred to use an inert medium during the polymerization catalyzed by the catalyst of the present invention. Catalyst poisons, such as those mentioned above, should be rigidly excluded from the polymerization medium. The reaction vessel and feed lines should be swept by an inert gas, such as purified nitrogen or argon, before introduction of monomer gases. Drying towers containing molecular sieves or a purification train wherein at least one tower contains silica gel and at least one tower contains an aluminum trialkyl compound are recommended for scrubbing monomer gases before they contact the catalyst of the present invention. Normally liquid monoolefins and non-conjugated dienes can be purified by fractional distillation and subsequent passage through silica gel or alumina.

Any material which is inert to the reactants is suitable for the reaction vessel. Glass, glass-enamel, or stainless steel are satisfactory. The reactor should be equipped with means for agitation. For runs at atmospheric pressure, the monomer gas inlet tube opening can be above or below the liquid surface of the reaction mixture. The gas outlet tube should have suitable traps to prevent the inflow of outside air.

As has been stated above, the catalyst of the present invention is generally used for polymerization in a liquid monomer diluent or an inert liquid medium. When tetrachloroethylene is the representative inert liquid medium employed, the polymers generally tend to form in solution. For convenient stirring, it is preferred that the concentration of polymer not exceed about 5% by weight, although it is to be understood that higher concentrations can be employed. Lower concentrations require inconvenient and economically more costly recovery of the solvent. When methylene chloride is employed as the reaction medium, copolymers are obtained in slurry form if the total concentration of monomers is below 2 molar and the temperature is below the normal boiling point of methylene chloride.

The polymerization is started by contacting the monomer (or monomers) with the novel coordination catalyst. This catalyst can be premixed in any order outside the reaction zone and subsequently introduced therein. Alternatively it can be formed, wholly or partially, in situ; the vanadium tetrachloride or the organometallic compound or both can be introduced in any order into the reaction zone.

In carrying out the polymerization process, the monomers are introduced, separately or in admixture, at a rate equal to or in excess of the rate at which polymer is formed. All of the monomers can be present before the run is started, alternatively, part or all of the monomers may be added during the polymerization. This introduction may be continuous or periodic.

The polymerization is stopped by deactivating the catalyst. An alcohol, such as isopropanol, is convenient. Polymers in slurry form can be isolated by conventional filtration. Polymers in solution can be isolated by evaporating the solvent or precipitation with a non-solvent. Frequently, the polymer is treated with an aqueous mineral acid, for example, 10% HCl, to remove vanadium and aluminum salts, the solution or slurry thereafter being washed with distilled water until the washings are acid-free. A non-volatile antioxidant, such as 2,2'-methylene bis(6-tert-butyl-4-methylphenol) or 4,4'-thiobis(2-tert-butyl-5-methylphenol) is often incorporated prior to the final isolation step to minimize possible oxidation and degradation of the polymer product.

The polymers can be prepared in the presence of the novel catalyst by a continuous process at atmospheric, sub-atmospheric, or superatmospheric pressure. Thus the inert medium, the aluminum and the vanadium compounds, and monomers may be introduced continuously into a polymerization zone at such a rate as to provide a residence time sufficient to build up the desired concentration of polymer in the polymerization mass. The residence time may vary widely from about 1 minute to several hours or more. In general, the residence time will be shorter as the concentrations of reactants and catalysts in the feed stream are increased and as the temperature is raised. The polymerization mass which continually flows from the polymerization zone is contacted in a subsequent zone with a catalyst deactivator; the polymer is ultimately continually obtained after suitable continuous purification and isolation procedures similar to those described above. If desired, the polymer produced by the continuous reaction can be purified and isolated by batch procedures.

The following examples will better illustrate the nature of the present invention; however, the invention is not intended to be limited to these examples. Parts are by weight unless otherwise indicated.

EXAMPLE 1

(A) *Preparation of (3-Diethylaminopropyl)-Diisobutyl Aluminum*

The apparatus described in Part A of Example 2 was used. The general procedure was analogous to that employed for making (3-ethoxypropyl)diisobutyl aluminum. Fifty-four grams (0.48 gram-mole) of N,N-diethylallylamine were slowly added to 19 grams (0.134 gram-mole) of diisobutyl aluminum hydride. The temperature rose to about 80° C. during this operation. The resulting mixture was stirred for 4 hours at 90–100° C. under nitrogen, then cooled to about 40° C., and concentrated under aspirator vacuum by removal of excess N,N-diethyl allylamine. Fractional distillation of the residual 40 milliliters gave 3 fractions:

(1) 3.1 grams, B.P. 82–106° C. (1.45–1.65 mm. Hg)
(2) 4.38 grams, B.P. 106–112° C. (1.6–1.7 mm. Hg)
(3) 11.32 grams, B.P. 112–113° C. (1.7 mm. Hg)

Fraction 3 was (3-diethylaminopropyl)diisobutyl aluminum.

(B) *Polymerization Reactor and the Preparation of a Monomer Mixture Therein*

The reaction flask was a 1-liter glass resin flask equipped with a mechanical stirrer, a thermometer, a gas inlet tube, a gas outlet tube, and a liquid inlet tube covered with a rubber serum cap. This apparatus was flame-dried and allowed to cool under a stream of purified nitrogen which was maintained during subsequent operations until monomer gases were introduced.

One liter of cyclohexane, which had been stored over silica gel and sparged with purified nitrogen, was introduced into the reaction flask and thereafter sparged with purified nitrogen while rapidly stirred. After the temperature had been adjusted to 25° C., the nitrogen feed was stopped and a feed stream supplying ethylene and propylene at the respective rates of 1.0 and 3.0 liters per minute was introduced into the reaction vessel below the liquid surface. The ethylene and propylene had been purified separately by passage through a molecular sieve column, Type 5–A, $\frac{1}{16}$ inch, and then combined in a mixing T. Continued inflow of the monomer feed stream saturated the cyclohexane with monomers; the excess monomer was allowed to escape through the gas outlet tube which was attached to suitable traps to prevent inflow of air to the apparatus.

(C) *Formation of (3 - Diethylaminopropyl)Diisobutyl Aluminum/$VCl_4$ Catalyst and Its Use in Preparing an Ethylene/Propylene Copolymer*

The coordination catalyst was formed in situ by addition, in turn, of 1 milliliter of a 1 molar solution of vanadium tetrachloride in cyclohexane and 1 milliliter of a 1 molar solution of (3-diethylaminopropyl)diisobutyl aluminum in cyclohexane from syringes through the rubber serum cap. A purple-brown color developed, there was an immediate evolution of heat, and a rapid viscosity build-up occurred. The reaction mixture was agitated for 10 minutes at a temperature ranging from 29° C., the maximum temperature attained, to 25° C., while monomer gases were continually introduced at the previously described rates. After 10 minutes the reaction was stopped by deactivating the catalyst by addition of 10 milliliters of isopropyl alcohol contained in 40 milliliters of cyclohexane. The copolymer solution was then extracted, in turn, with 100 milliliters of 2.5 N hydrochloric acid and 500 milliliters of distilled water. Overnight evaporation of the solvent and mill drying of the residual copolymer gave 19.85 grams of ethylene/propylene copolymer containing 78.5 percent by weight propylene monomer units according to an infrared analysis of a pressed film.

(D) *Comparative Behavior of a Closely Related Catalyst Outside the Scope of the Present Invention*

The procedures of Parts B and C above were repeated except that the catalyst was made by introduction of 1 milliliter of a 1 molar solution of vanadium oxytrichloride in hexane and 2 milliliters of a 1 molar (3-diethylaminopropyl)diisobutyl aluminum solution in cyclohexane. There was no apparent reaction and the copolymer isolated weighed only 0.82 gram.

EXAMPLE 2

(A) *Preparation of (3-Ethoxypropyl)Diisobutyl Aluminum*

Forty-six grams (0.534 gram-mole) of allyl ethyl ether were slowly added from a hypodermic syringe to 19 grams (0.134 gram-mole) of diisobutyl aluminum hydride in a 4-necked 100-ml. round-bottom flask, equipped with a magnetic stirrer, reflux condenser, and thermometer and supplied with a nitrogen atmosphere. During the addition of the first third of the ether, heat was evolved. The rate of addition was so regulated that the temperature did not rise over 35° C. The mixture was then heated to 72–74° C. and kept at that temperature, while agitated under nitrogen, for 6.25 hours. It was then cooled under nitrogen and left at 25° C. for about 16 hours. Removal of a major portion of the excess ethyl allyl ether under aspirator vacuum at a temperature below 30° C. reduced the volume to 35–40 milliliters. Nitrogen was introduced to release the vacuum and the mixture was transferred to a 50-ml. round-bottom flask by means of a hypodermic syringe. Fractional distillation in a 1.5-foot spinning band column gave 3 fractions:

(1) 4.5 grams, B.P. 56–94° C. (2.2 mm. Hg)
(2) 17.8 grams, B.P. 94–95° C. (2.3–2.5 mm. Hg)
(3) Higher boiler Fraction 2 was (3-ethoxypropyl)diisobutyl aluminum.

(B) *Reaction Vessel and the Preparation of a Monomer Mixture Therein*

The procedure described in Part B of Example 1 above was repeated.

(C) *Formation of (3-Ethoxypropyl)Diisobutyl Aluminum/$VCl_4$ Catalyst and Its Use in Preparing an Ethylene/Propylene Copolymer*

A vanadium tetrachloride/(3-ethoxypropyl)diisobutyl aluminum coordination catalyst was formed by sequential introduction of 1 milliliter of a 1 molar solution of vanadium tetrachloride in cyclohexane and 1 milliliter of 1 molar solution of (3-ethoxypropyl)diisobutyl aluminum in cyclohexane to the monomer mixture prepared in Part B above. A dark purple color resulted and strong evolution of heat occurred. After the reaction mixture had been agitated for 10 minutes at 28 to 25° C. while ethylene and propylene were continually introduced at the above-described rates, the catalyst was deactivated and the reaction mixture worked up in accordance with the procedure of Example 1–C above. The ethylene/propylene copolymer obtained weighed 24.4 grams, contained 80 percent by weight propylene monomer units, and had an inherent viscosity (0.1 percent by weight solution in tetrachloroethylene at 30° C.) of 3.44.

(D) *Use of a Catalyst Having a Higher Proportion of Aluminum in Making an Ethylene/Propylene Copolymer*

The procedure of Part C above was repeated except that the aluminum concentration in the reaction vessel was doubled, the aluminum catalyst component was added first, and the copolymerization time was shortened to 5 minutes. The copolymer of ethylene and propylene obtained weighed 11.7 grams, contained 81 percent by weight propylene monomer units, and exhibited an inherent viscosity (measured as above) of 3.03.

(E) *Preparation and Use of the Coordination Catalyst of Part C in Benzene*

The procedure of Part C above was repeated except that the monomer solution was prepared in benzene and the copolymerization time was increased to 15 minutes. 9.45 grams of copolymer were obtained having 63 percent by weight propylene monomer units and exhibiting an inherent viscosity of 3.77 (measured as above).

EXAMPLE 3.—PREPARATION OF ETHYLENE/PROPYLENE COPOLYMER AT 70° C. IN TETRACHLOROETHYLENE (A) *(3-Ethoxypropyl)Diisobutyl Aluminum/VCl$_4$ Employed*

The general procedure of Example 1 above was employed except as noted hereafter. The reaction medium was tetrachloroethylene and the temperature was 70° C. The catalyst was formed by introducing, in turn, 1 millimole of a solution of vanadium tetrachloride in cyclohexane and 2 millimoles of a solution of (3-ethoxypropyl)diisobutyl aluminum in cyclohexane into the saturated monomer solution. After 30 minutes reaction time at 70° C. there were isolated 35 grams of a rubbery ethylene/propylene copolymer containing 71 weight percent propylene monomer units and exhibiting an inherent viscosity (measured on a 0.1 percent by weight solution in tetrachloroethylene at 30° C.) of 1.86.

(B) *Diisobutyl Aluminum Chloride/VCl$_4$ Employed*

For purpose of comparison, an experiment was run outside the scope of the present invention by employing diisobutyl aluminum chloride in place of (3-ethoxypropyl)diisobutyl aluminum catalyst component in the procedure of Part A above. The copolymer obtained weighed only 8.4 grams, contained 65 percent by weight propylene monomer units, and exhibited an inherent viscosity (measured as above) of 1.35.

(C) *Triisobutyl Aluminum/VCl$_4$ Catalyst Employed*

For the purpose of comparison, an experiment was run outside the scope of the present invention by substituting triisobutyl aluminum for (3-ethoxypropyl)diisobutyl aluminum in the procedure of Part A above. Only 12.7 grams of ethylene/propylene copolymer were obtained; this product was characterized by a propylene monomer unit content of 77 percent by weight and an inherent viscosity (measured as above) of 1.96.

(D) *Triisobutyl Aluminum/Tetrahydrofuran/VCl$_4$ Catalyst Employed*

For purpose of comparison, an experiment was run outside the scope of the present invention by substituting triisobutyl aluminum and tetrahydrofuran, 1 mole each, for each mole of the aluminum component called for in the procedure of Part A above. The yield of ethylene/propylene copolymer obtained was only 7.9 grams; the product contained 70 percent by weight propylene monomer units and exhibited an inherent viscosity (measured as above) of 1.02.

Another experiment was run outside the scope of the present invention wherein 1 mole of triisobutyl aluminum and ½ mole of tetrahydrofuran were substituted for each mole of the aluminum component called for in the procedure of Part A above. The yield of copolymer was only 13.4 grams; the product contained 61 percent by weight propylene monomer units and exhibited an inherent viscosity (measured as above) of 1.96.

(E) *Diisobutyl Aluminum Chloride/VOCl$_3$ Catalyst Employed*

(1) For purpose of comparison, an experiment was run outside the scope of the present invention in which diisobutyl aluminum chloride and vanadium oxytrichloride were substituted for the respective aluminum and vanadium compounds called for in the procedure of Part A above. The yield of copolymer was only 15.6 grams; this material contained 61 percent by weight propylene monomer units and exhibited an inherent viscosity (measured as above) of 3.06.

(2) The above procedure (E-1) was repeated except that the reaction time was lengthened to 60 minutes. The yield of copolymer (22.75 grams) was still well below that obtained in Part A above. This product contained 59 percent by weight propylene monomer units and exhibited an inherent viscosity (measured as above) of 2.45.

(F) *(3-Ethoxypropyl/Diisobutyl Aluminum/VCl$_4$ Catalyst Used*

The procedure of Part A was repeated except that the reaction time was lengthened to 60 minutes. There were obtained 52.5 grams of ethylene/propylene copolymer which exhibited an inherent viscosity (measured as above) of 1.76 and contained 67 percent by weight propylene monomer units. This yield is considerably superior to that obtained in Part E-2 above where a catalyst outside the scope of the invention was used.

EXAMPLE 4

*Preparation of Ethylene/Propylene Copolymer at 70° C. in Tetrachloroethylene With a (3-Ethoxypropyl)Diisobutyl Aluminum/VCl$_4$ Catalyst Formed at 70° in Absence of Monomers*

The procedure of Part A of Example 3 was repeated except that the (3-ethoxypropyl)diisobutyl aluminum/vanadium tetrachloride catalyst was preformed in the absence of monomers at 70° C. by addition of the vanadium and aluminum components, in turn, to the agitated tetrachloroethylene solvent at 70° C. under nitrogen. After the resulting dark purple-brown catalyst had been aged for about ½ minute, the monomer feed stream was introduced supplying propylene and ethylene, respectively, at the rates of 4.5 liters/minute and 1.5 liters/minute for the first 5 minutes and 3 liters/minute and 1 liter/minute for the remaining 25 minutes. The product obtained weighed 26.5 grams, contained 65 percent propylene monomer units, and exhibited an inherent viscosity (measured on a 0.1 percent by weight solution at 30° C. in tetrachloroethylene) of 1.96.

EXAMPLE 5

(A) *Preparation of an Ethylene/Propylene/1,4-Hexadiene Copolymer at 70° C. in Tetrachloroethylene With a (3-Ethoxypropyl)Diisobutyl Aluminum/VCl$_4$ Catalyst*

The general procedure of Example 1 above was repeated except as noted hereafter. After the tetrachloroethylene reaction medium had been heated to 70° C. and saturated by introduction of a monomer gas mixture supplying ethylene and propylene at respective rates of 0.5 liter/minute and 1.5 liters/minute, 3.15 grams (0.038 grammole) of 1,4-hexadiene monomer, which had just been passed through an alumina column and kept under nitrogen, was introduced from a syringe. The coordination catalyst was then made by successive introduction from syringes of 1 milliliter of a 1 molar cyclohexane solution of vanadium tetrachloride and 4 milliliters of a 1 molar cyclohexane solution of (3-ethoxypropyl)diisobutyl aluminum. The copolymer isolated after 30 minutes reaction time at 70° C., weighed 9.6 grams and had the following monomer unit composition by weight: ethylene, 39 percent; propylene, 59 percent; and 1,4-hexadiene, 2 percent. This copolymer exhibited an inherent viscosity (measured on a 0.1 percent by weight solution in tetrachloroethylene at 30° C.) of 1.77.

(B) *Preparation of Ethylene/Propylene/1,4-Hexadiene Copolymer at 50° C. in Tetrachloroethylene With (3-Ethoxypropyl)Diisobutyl Aluminum/VCl$_4$ Catalyst*

The procedure of Part A above was repeated except that the reaction temperature was 50° C. and the monomer gas feed was changed to supply ethylene and propylene at respective rates of 1 liter/minute and 3 liters/minute. The copolymer obtained weighed 14.8 grams and analyzed for 61 percent by weight propylene monomer units and 2.5 percent by weight of 1,4-hexadiene monomer units. The inherent viscosity (measured as above) was 2.19.

EXAMPLE 6

*Preparation of an Ethylene/Propylene/1,4-Hexadiene Copolymer in Cyclohexane at 0° C. With a (3-Ethoxypropyl)Diisobutyl Aluminum/VCl$_4$ Catalyst*

The general procedure of Example 1 was repeated except as noted hereafter. After the cyclohexane had been cooled to 0° C. and saturated with a monomer gas mixture supplying ethylene and propylene at respective rates of 1.5 liters/minute and 3 liters/minute, 6 milliliters (0.05 gram-mole) of 1,4-hexadiene were introduced into the reactor from a syringe. Shortly before its addition, this monomer had been purified by passage through an alumina column and stored under nitrogen. The coordination catalyst was formed by introduction, in turn, of 0.25 milliliter of a 1 molar solution of vanadium tetrachloride in cyclohexane and 0.5 milliliter of a 1 molar solution of (3-ethoxypropyl)diisobutyl aluminum in cyclohexane. In the reactor, the concentrations of vanadium and aluminum were 0.25 millimolar and 0.5 millimolar, respectively. After ethylene and propylene had been introduced into the agitated reaction mixture at 0° C. for 30 minutes, the copolymer subsequently isolated by the procedure of Example 1 weighed 10.5 grams, contained 56 percent by weight propylene monomer units and 2.4 percent by weight 1,4-hexadiene monomer units and exhibited an inherent viscosity of 2.93 (measured on a 0.1 percent by weight solution in tetrachloroethylene at 30° C.).

EXAMPLE 7

*Preparation of Ethylene/Propylene/1,4-Hexadiene Copolymer at 0° C. in n-Hexane With a (3-Ethoxypropyl) Diisobutyl Aluminum/VCl$_4$ Catalyst*

The general procedure of Example 1 above was repeated except as noted hereafter. The reaction medium was n-hexane. After the solvent had been cooled to 0° C. while being saturated with ethylene and propylene monomers, 9 milliliters (0.075 gram-mole) of 1,4-hexadiene was introduced from a syringe into the reaction flask. This monomer had been passed just before through a column of alumina and stored under purified nitrogen. Thereafter the coordination catalyst was formed by introducing, in turn, 1 milliliter of a 1 molar cyclohexane solution of vanadium tetrachloride and 4 milliliters of a 1 molar cyclohexane solution of (3-ethoxypropyl)diisobutyl aluminum. After the reaction mixture had been agitated for 30 minutes at 0° C. while the above-described monomer feed was maintained, the catalyst was deactivated and the copolymer was isolated by the procedure described in Example 1 above. The copolymer obtained weighed 12.8 grams and analyzed for 57 percent by weight propylene monomer units and 3,4 percent 1,4-hexadiene monomer units. The inherent viscosity was 3.07 (measured on a 0.1 percent by weight solution in tetrachloroethylene at 30° C.).

100 parts by weight of the above-described copolymer were compounded on a rubber roll mill at about 100° C. with 50 parts of high-abrasion furnace black. The resulting composition was compounded thereafter on a rubber roll mill at 25–30° C. with 1 part of N-phenyl-beta-naphthylamine, 5 parts of zinc oxide, 1.5 parts of tetramethylthiuram monosulfide, 0.5 part of 2-mercaptobenzothiazole, and 1 part of sulfur. The resulting composition was loaded into a cold mold and cured under pressure thereafter at 160° C. for 60 minutes. The vulcanizates obtained exhibited the following properties at 25° C.: modulus at 300% extension, 1,865 p.s.i.; tensile strength at the break, 2,230 p.s.i.; extension at the break, 340%; Yerzley resilience, 58.5%; Shore A hardness, 63; and compression set (22 hours at 70° C.), 14%.

EXAMPLE 8

*Preparation of an Ethylene/Propylene/11-Ethyl-1,11-Tridecadiene Copolymer in Tetrachloroethylene at 70° C. With (3 - Ethoxypropyl)Diisobutyl Aluminum/VCl$_4$ Catalyst*

The general procedure of Example 1 above was repeated except as noted hereafter. After the tetrachloroethylene reaction solvent had been heated to 70° C. and saturated with monomers by continuous introduction of ethylene and propylene at respective rates of 1.5 liters/minute and 3 liters/minute, 6.2 milliliters (0.0235 gram-mole) of 11-ethyl-1,11-tridecadiene were introduced from a syringe. This monomer, just prior to its introduction, had been purified by passage through alumina and stored under nitrogen. The coordination catalyst was then prepared in situ in the reactor by introduction, in turn, of 1 milliliter of a 1 molar cyclohexane solution of vanadium tetrachloride and 2 milliliters of a 1 molar cyclohexane solution of (3-ethoxypropyl)diisobutyl aluminum. The monomer gases were continually introduced thereafter at the above-described rates for 30 minutes while the reaction mixture was maintained at 70° C. After the catalyst had been deactivated and the copolymer had been isolated by the procedure described in Example 1 above, 38.5 grams of copolymer were obtained by pan drying. This copolymer was further purified by being cut into small pieces and stirred for 20 hours in 1 liter of acetone at room temperature under purified nitrogen to extract unreacted diene. The copolymer was then mechanically separated, oven-dried for several hours at 95° C., and milled at room temperature. The copolymer finally obtained exhibited an inherent viscosity of 2.35, 2.37 (measured on a 0.1 percent by weight solution in tetrachloroethylene at 30° C.). It had 58 percent by weight propylene monomer units and about 0.5 gram-mole of carbon-carbon double bonds per kilogram of copolymer.

EXAMPLE 9

(A) *Preparation of (3-n-Propylmercaptopropyl) Diisobutyl Aluminum*

(3-n-propylmercaptopropyl)diisobutyl aluminum was prepared by a procedure analogous to that described in Part A of Example 2. Allyl propyl sulfide (9.15 grams, 0.79 gram-mole) was slowly added to 27.5 grams (0.194 gram-mole) of diisobutyl aluminum hydride under nitrogen while stirring was maintained. External heat was applied to resulting mixture. When the temperature had risen to about 80° C., heat was evolved and the temperature rose to 110° C. After application of external cooling had lowered the temperature to 100° C., the mixture was stirred for 6 hours at 97–102° C. It was then cooled to 25° C. under nitrogen and allowed to stand at 25° C. under nitrogen for 2 days. The excess allyl propyl sulfide was removed under oil pump vacuum at 30–40° C. The residual 57 milliliters were transferred with a hypodermic syringe to a 100-ml. round-bottom flask and fractionally distilled. The entire 38 grams which were collected, B.P. 60–80° C. (about 0.6 mm. Hg) were redistilled. Four fractions were taken:

(1) B.P. 50–67° C. (1.3–1.0 mm. Hg)
(2) B.P. 69–86° C. (0.95–0.85 mm. Hg)
(3) B.P. 85–87.5° C. (0.8 mm. Hg)
(4) B.P. 93–99° C. (0.8–0.9 mm. Hg)

Fraction 3 was (3-n-propylmercapto)diisobutyl aluminum.

*Analysis.*—Calcd. for $C_{14}H_{31}AlS$: C, 65.1; H, 12.05; Al, 10.43; S, 12.4. Found: C, 65.3, 65.1; H, 12.4, 12.6; S, 12.5, 12.2.

(B) *Polymerization Reactor and the Preparation of a Monomer Mixture Therein*

The apparatus described in Example 1, Part B was used.

17

One liter of tetrachloroethylene, which had been stored over silica gel and sparged with purified nitrogen, was introduced into the reaction flask and thereafter sparged with purified nitrogen while rapidly stirred. After the temperature had been adjusted to 25° C., the nitrogen feed was stopped and a feed stream supplying ethylene and propylene at the respective rates of 1.0 and 3.0 liters per minute was introduced into the reaction vessel below the liquid surface.

(C) *In Situ Formation of (3-n-Propylmercaptopropyl) Diisobutyl Aluminum/VCl₄ Catalyst and Its Use in Preparing an Ethylene/Propylene Copolymer at Room Temperature*

(1) The coordination catalyst was formed in situ by addition, in turn, of one milliliter of a molar solution of vanadium tetrachloride in cyclohexane and 1 milliliter of a 1 molar solution of (3-n-propylmercaptopropyl)diisobutyl aluminum in cyclohexane from syringes through the serum cap. Agitation and monomer gas inflow (at the above-specified rates) were continued for 30 minutes while the temperature was maintained at 25° C. After the catalyst had been deactivated with alcohol, the copolymer solution was purified and concentrated according to the procedure described in Part C of Example 1 above. The ethylene/propylene copolymer isolated weighed 23.5 grams and contained 64 percent by weight propylene monomer units according to an infrared analysis of a pressed film.

(2) The procedure of Part C–1 was repeated except that 2 milliliters of the cyclohexane solution of (3-n-propylmercaptopropyl)diisobutyl aluminum were employed. The ethylene/propylene copolymer isolated weighed 20.7 grams and contained 70 percent by weight propylene monomer units.

(3) The procedure of Part C–1 was repeated except that 4 milliliters of the cyclohexane solution of (3-n-propylmercaptopropyl)diisobutyl aluminum were employed. The ethylene/propylene copolymer isolated weighed 18.1 grams and contained 70 percent by weight propylene monomer units.

EXAMPLE 10

(A) *Preparation of an Ethylene/Propylene/1,4-Hexadiene Copolymer in Tetrachloroethylene in a Continuous Reactor at 100° C. at Superatmospheric Pressure in the Presence of a (3-Ethoxypropyl)Diisobutyl Aluminum/VCl₄ Catalyst*

The catalyst was continuously formed at about 20–25° C. in a mixing chamber, having a residence time of about one minute, into which the following streams were introduced:

| | Liters/hr. |
|---|---|
| 0.030 molar VCl₄ (in tetrachloroethylene) | 0.2 |
| 0.060 molar (3-ethoxypropyl)diisobutyl aluminum (in tetrachloroethylene) | 0.3 |
| Additional tetrachloroethylene | 2.0 |

The pre-mixed catalyst thereby formed was continuously introduced into a one-liter copolymerization reactor which was maintained full of liquid at 100° C. (residence time 5 minutes) and operated at 400 lbs./sq. in. pressure. In addition to the catalyst stream, the reactor was fed by streams continuously supplying the following components at about 25° C.:

| | |
|---|---|
| Ethylene lbs./hr | 0.465 |
| Propylene lbs./hr | 4.17 |
| 1,4-hexadiene lbs./hr | 0.543 |
| Tetrachloroethylene liters/hr | 5.05 |

The reactor yielded 219.6 grams/hr. of a solid ethylene/propylene/1,4-hexadiene copolymer analyzing for 43.5 percent by weight propylene monomer units and 2.18 percent by weight trans 1,4-hexadiene monomer units.

18

(B) *Vulcanization of the Copolymer*

One hundred parts by weight of the copolymer made in Part A above were compounded on a rubber roll mill at about 100° C. with 50 parts by weight of high abrasion furnace black, 5 parts by weight of zinc oxide, 1.5 parts by weight of tetramethyl thiuram monosulfide, and 1.0 part by weight of sulfur. The compounded stock was then cured for 60 minutes at 160° C. to give vulcanizates displaying the following properties at 25° C.:

| | |
|---|---|
| Modulus at 300% extension (p.s.i.) | 1690 |
| Tensile strength at the break (p.s.i.) | 3350 |
| Extension at the break (percent) | 500 |
| Yerzley resilience (percent) | 44 |
| Shore A hardness | 74 |

Results similar to those described in Examples 1–C, 2–C, 2–D, 2–E, 3–A, 3–F, 4, 5–A, 5–B, 6, 7, 8, 9–C and 10 are obtained when the respective organoaluminum compounds used in these examples are replaced by any one of the following compounds:

(4-methoxybutyl)diethyl aluminum
(3-ethoxypropyl)di-n-octyl aluminum
(3-ethoxypropyl)isobutyl aluminum hydride
[2-(2-furyl)ethyl]diisobutyl aluminum
(4-dimethylaminobutyl)di-n-octyl aluminum
(3-diethylaminopropyl)diethyl aluminum
(4-ethylmercaptobutyl)diethyl aluminum As many widely different embodiments of this invention may be made without departing from the spirit and scope thereof it is to be understood that this invention is not limited to the specific embodiments thereof except as defined in the appended claims.

What is claimed is:

1. A polymerization catalyst obtained by mixing vanadium tetrachloride with an organometallic compound having a structure selected from the group consisting of

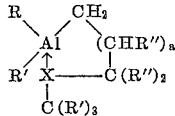

and

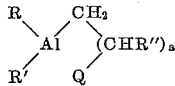

wherein R is an alkyl radical of from 1 to 8 carbon atoms; R' is a radical selected from the group consisting of hydrogen and an alkyl radical of from 1 to 8 carbon atoms; R'' is a radical selected from the group consisting of hydrogen and an alkyl radical of from 1 to 2 carbon atoms; $a$ is an integer from 1 to 2; X is a radical selected from the group consisting of —O—, —S—, and

and Q is a 5 to 6 membered heterocyclic radical selected from the group consisting of

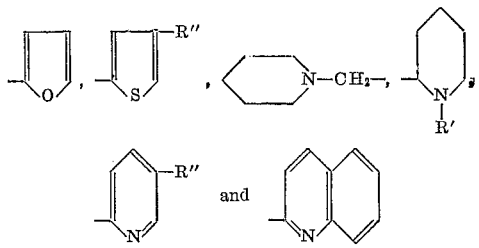

2. The polymerization catalyst of claim 1 wherein the mixing is carried out in an inert solvent selected from the group consisting of a hydrocarbon and a halogenated hydrocarbon solvent.

3. A polymerization catalyst obtained by mixing vanadium tetrachloride and (3-diethylaminopropyl)diisobutyl aluminum in sufficient quantities so as to provide a molar ratio of aluminum to vanadium of at least 1:1.

4. A polymerization catalyst obtained by mixing vanadium tetrachloride and (3-ethoxypropyl)diisobutyl aluminum in sufficient quantities so as to provide a molar ratio of aluminum to vanadium of at least 1:1.

5. A polymerization catalyst obtained by mixing vanadium tetrachloride and 3-n-propylmercaptopropyl diisobutyl aluminum in sufficient quantities so as to provide a molar ratio of aluminum to vanadium of at least 1:1.

6. A process for preparing high molecular weight hydrocarbon polymers which comprises contacting the polymerizable monomers with a polymerization catalyst obtained by mixing vanadium tetrachloride with an organometallic compound having a structure selected from the group consisting of

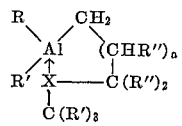

and

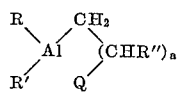

wherein R is an alkyl radical of from 1 to 8 carbon atoms; R' is a radical selected from the group consisting of hydrogen and an alkyl radical of from 1 to 8 carbon atoms; R'' is a radical selected from the group consisting of hydrogen and an alkyl radical of from 1 to 2 carbon atoms; $a$ is an integer from 1 to 2; X is a radical selected from the group consisting of —O—, —S—, and

and Q is a 5 to 6 membered heterocyclic radical selected from the group consisting of

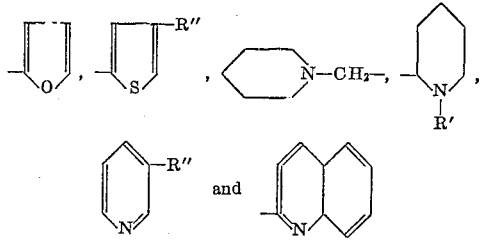

7. The process of claim 6 wherein the polymerizable monomers are ethylene and propylene.

8. The process of claim 6 wherein the polymerizable monomers are ethylene, propylene and 1,4-hexadiene.

9. The process of claim 7 wherein the catalyst is obtained by mixing vanadium tetrachloride with (3-ethoxypropyl)diisobutyl aluminum.

10. The process of claim 8 wherein the catalyst is obtained by mixing vanadium tetrachloride with (3-alkoxypropyl)diisobutyl aluminum.

References Cited in the file of this patent

FOREIGN PATENTS 534,792    Belgium _____ Jan. 31, 1955